(12) United States Patent
Spinelli

(10) Patent No.: US 7,530,429 B2
(45) Date of Patent: May 12, 2009

(54) LADDER HAVING EXPANDABLE MEMBERS

(75) Inventor: Thomas Spinelli, East Northport, NY (US)

(73) Assignee: Omnitek Partners LLC, Bayshore, NY (US)

( * ) Notice: Subject to any disclaimer, the term of this patent is extended or adjusted under 35 U.S.C. 154(b) by 708 days.

(21) Appl. No.: 11/150,651

(22) Filed: Jun. 11, 2005

(65) Prior Publication Data

US 2006/0278473 A1   Dec. 14, 2006

(51) Int. Cl.
   *E06C 1/00*   (2006.01)
(52) U.S. Cl. .................... 182/194; 182/228.1
(58) Field of Classification Search ............. 182/228.1, 182/228.3, 228.4, 228.6, 46, 194
   See application file for complete search history.

(56) References Cited

U.S. PATENT DOCUMENTS

| | | | | |
|---|---|---|---|---|
| 2,921,645 A | * | 1/1960 | Morrow et al. ............. | 182/157 |
| 5,203,427 A | * | 4/1993 | Williams et al. ............ | 182/129 |
| 6,269,908 B1 | * | 8/2001 | Yeamans et al. ............ | 182/196 |
| 2006/0086572 A1 | * | 4/2006 | Martin ....................... | 182/196 |
| 2006/0278473 A1 | * | 12/2006 | Spinelli ....................... | 182/196 |
| 2006/0280013 A1 | * | 12/2006 | Spinelli ....................... | 365/221 |
| 2006/0280014 A1 | * | 12/2006 | Spinelli ....................... | 365/221 |
| 2008/0190698 A1 | * | 8/2008 | Amalric et al. ............. | 182/207 |

* cited by examiner

*Primary Examiner*—Alvin C. Chin-Shue
*Assistant Examiner*—Candace L Bradford

(57) ABSTRACT

A ladder including: first and second expandable members, each of the first and second expandable members including: a covering capable of expansion, the covering defining a cavity; and expansion means for expanding foam in the cavity in an expansion direction to expand the covering into a predetermined shape; each of the first and second expandable members having a plurality of holes; and a rung, having a first end disposed in each of the plurality of holes of the first expandable member and a second end disposed in a corresponding hole in the second expandable member.

15 Claims, 12 Drawing Sheets

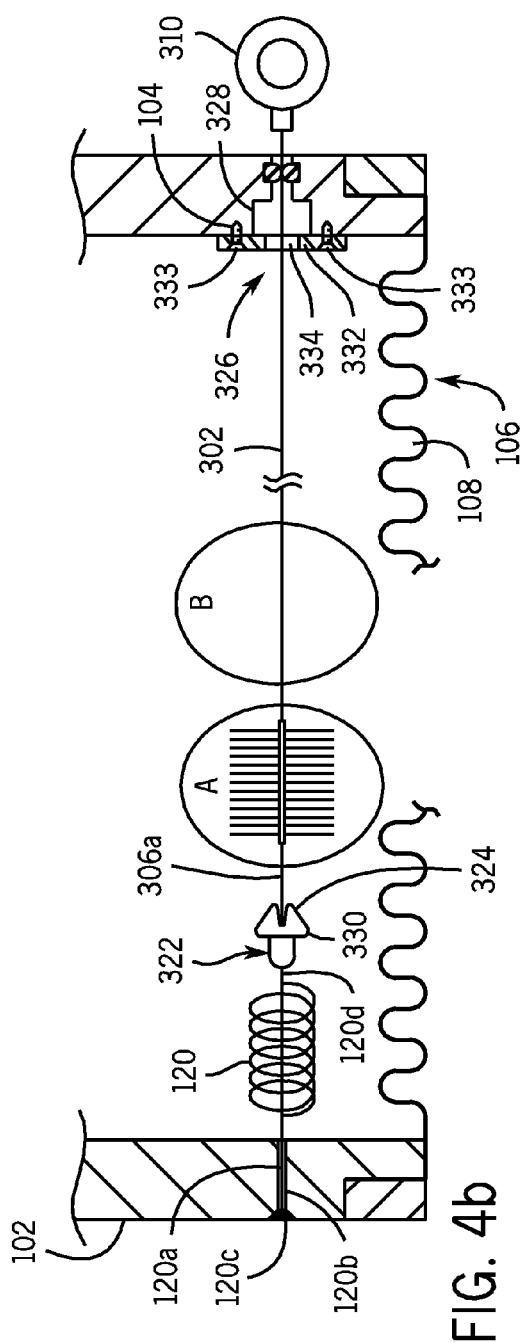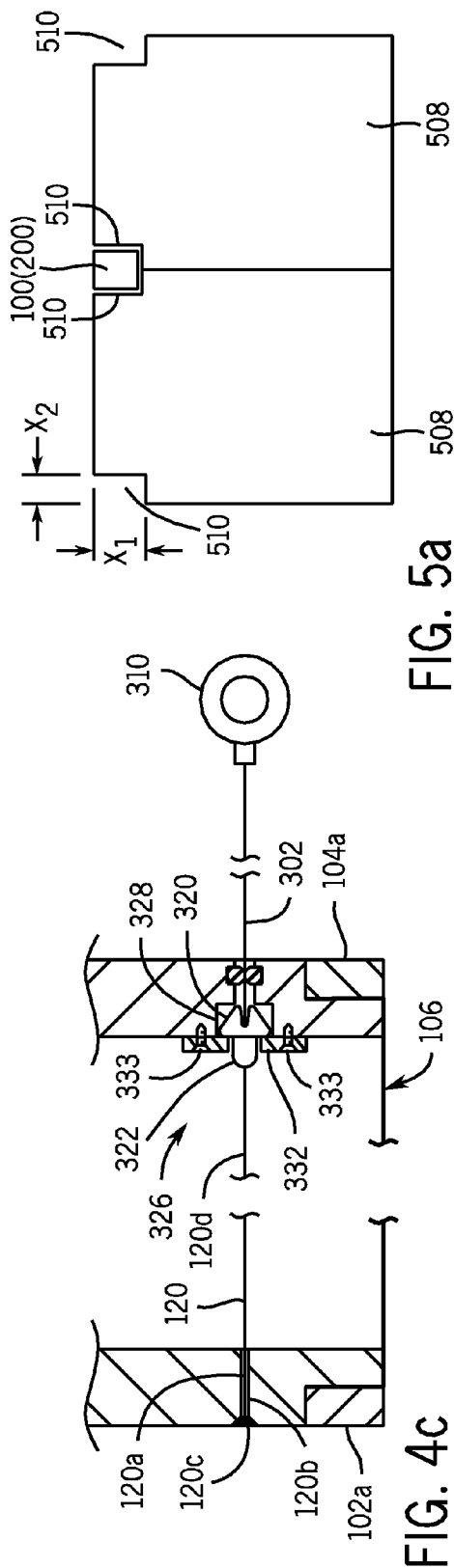

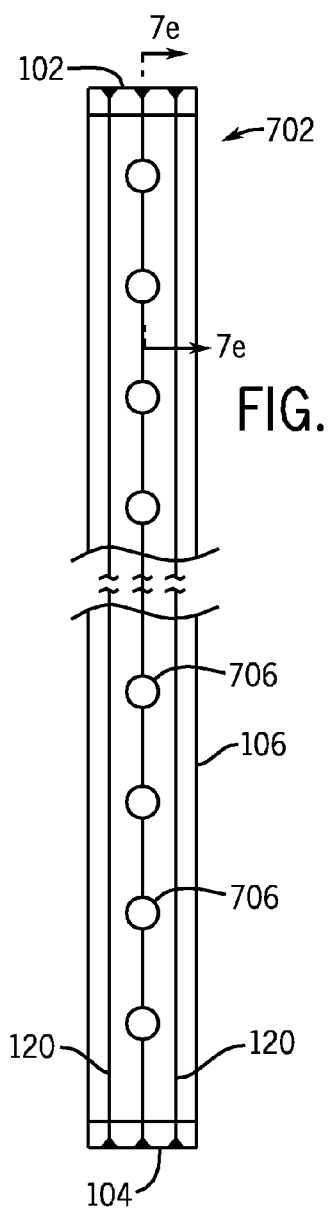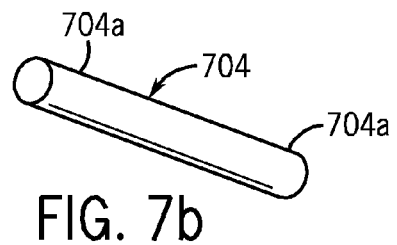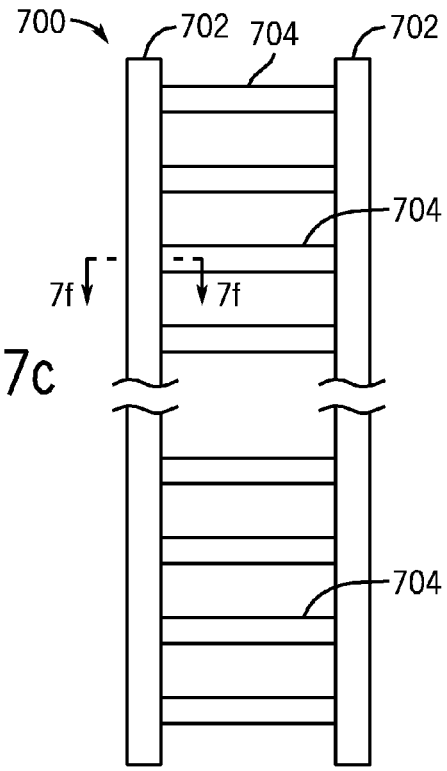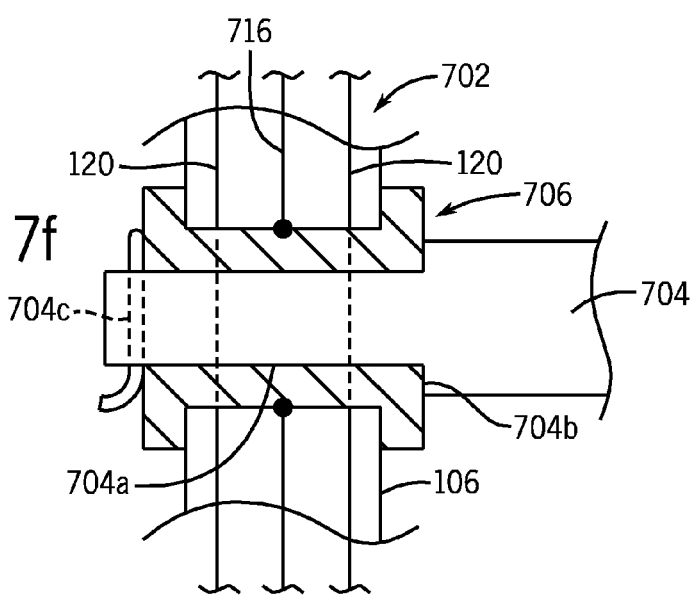
FIG. 7a
FIG. 7b
FIG. 7c
FIG. 7f

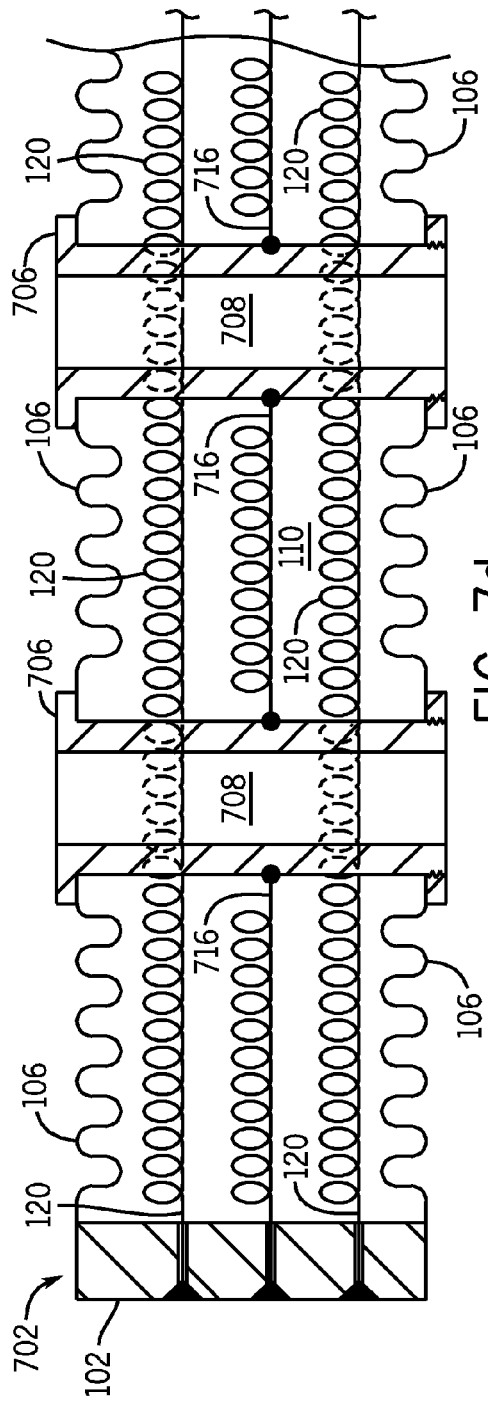
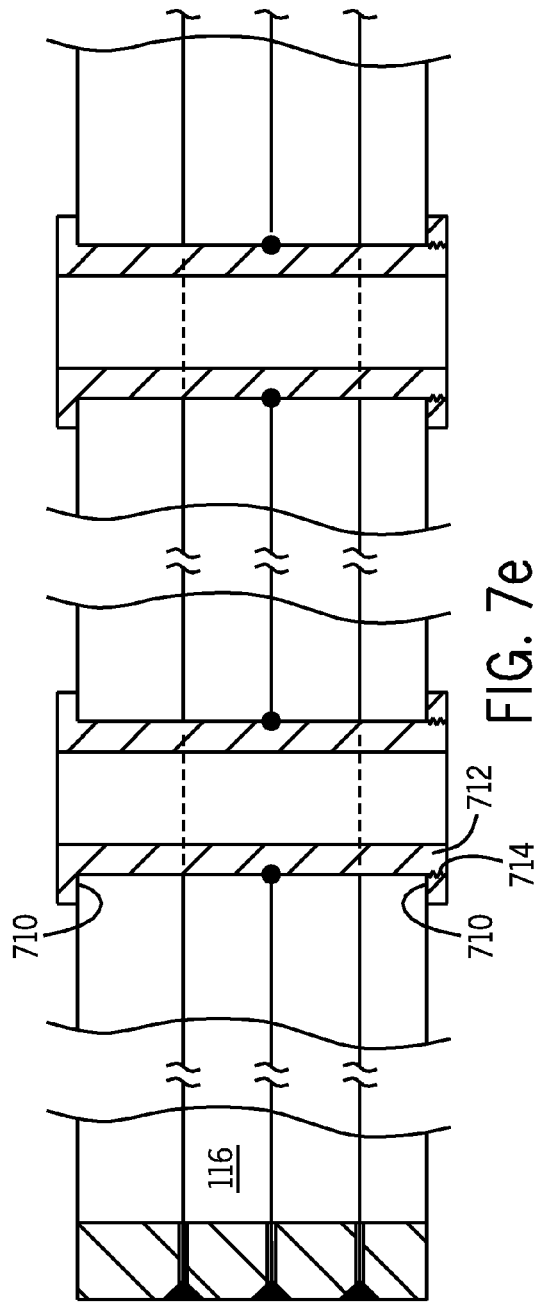
FIG. 7d
FIG. 7e

LADDER HAVING EXPANDABLE MEMBERS

CROSS REFERENCE TO RELATED APPLICATION

This application is related to U.S. application Ser. No. 11/150,425, filed on the same day herewith, which is incorporated herein by its reference.

BACKGROUND OF THE INVENTION

1. Field of the Invention

The present invention relates generally to expandable devices and structures and, more particularly, to devices and structures which expand at least in part due to expandable foam.

2. Prior Art

Collapsible devices are known in the art that generally make use of mechanical linkages or telescoping parts to make a device more compact. However, such linkages and telescoping parts have a limit to which they can compact and/or expand. Furthermore, such devices are not as mechanically stable as devices that do not expand.

Expandable structures are also known in the art. Such structures generally use air or other gaseous pressure to expand an inflatable member or collection of members. However, such structures suffer from poor structural strength and are easily damaged if the skin of such structures is compromised (e.g., pierced or otherwise compromised). In such a situation, the failure of the structure is often catastrophic.

SUMMARY OF THE INVENTION

Accordingly, a ladder is provided. The ladder comprising: first and second expandable members, each of the first and second expandable members comprising: a covering capable of expansion, the covering defining a cavity; and expansion means for expanding foam in the cavity in an expansion direction to expand the covering into a predetermined shape; each of the first and second expandable members having a plurality of holes; and a rung, having a first end disposed in each of the plurality of holes of the first expandable member and a second end disposed in a corresponding hole in the second expandable member.

The covering can be pleated when compact.

The ladder can further comprise first and second endplates, the covering being disposed between the first and second endplates.

The expansion means can comprise: a first inlet formed in one of the first and second endplates, the first inlet being in communication with the cavity; and a source in communication with the first inlet for supplying foam in a liquid state to the cavity via the first inlet. In which case the ladder can further comprise: a second inlet formed in one of the first and second endplates, the second inlet being in communication with the cavity; and a gas source in communication with the second inlet for supplying gas to the cavity via the second inlet for at least one of pre-expanding the covering and facilitating filling of the cavity with the foam.

The ladder can further comprise bulge prevention means for preventing bulging of the covering in a direction other than the expansion direction.

The ladder can further comprise one or more tensile elements disposed in the cavity for carrying at least a portion of a tensile load on the first and second expandable members.

The expansion means can comprise: first and second capsules disposed in the cavity, the first capsule having a first liquid therein, the second capsule having a second liquid therein, the first and second liquids when combined reacting to form the foam; and means for mixing the first and second liquids. The means for mixing can comprise: the first and second capsules having a skin encapsulating the first and second liquids, respectively; and a cable having the first and second capsules formed thereon, the cable having a mixing means disposed on the cable, the cable being capable of being withdrawn through the cavity such that the skin is broken and the mixing means facilitates mixing of the first and second liquids. The cable can further comprise: one or more wires for carrying at least a portion of a tensile load on the member, each of the one or more tensile elements being capable of being expanding in the expansion direction and being connected to one of the first and second endplates at a first end and being connected to the cable at a second end; and means for fixing the second end to the other of the first and second endplates upon expansion of the one ore more wires.

The ladder can further comprise a grommet disposed in each of the plurality of holes. In which case, the ladder can further comprise a connection means for connecting each of the grommets together such that they react to an applied force as a unitary member. The ladder can further comprise first and second endplates, the covering being disposed between the first and second endplates, wherein the connection means comprises a wire connected between each of the grommets and between at least one of the first and second endplates and at least one of the grommets. The wire can be connected between each of the grommets by winding the wire around an outside circumference of the grommet.

The ladder can further comprise locking means for locking the rungs in the plurality of holes.

Also provided is a method for forming a ladder. The method comprising: forming first and second expandable members used in constructing the ladder, the forming of each of the first and second expandable members comprising: expanding a covering to define a cavity; and expanding foam in the cavity in an expansion direction to expand the covering into a predetermined shape; and connecting the first and second expandable members together by disposing a plurality of rungs therebetween.

The connecting can comprise: disposing a first end of each of the rungs in each of the plurality of holes of the first expandable member and disposing a second end of each of the rungs in a corresponding hole in the second expandable member.

BRIEF DESCRIPTION OF THE DRAWINGS

These and other features, aspects, and advantages of the apparatus of the present invention will become better understood with regard to the following description, appended claims, and accompanying drawings where:

FIG. 4 illustrates an alternative embodiment for expanding the structural member of FIG. 1a.

FIG. 4b illustrates a variation of the embodiment of the structural member of FIG. 4 in which the structural member is in a compact configuration.

FIG. 4c illustrates the variation of the embodiment of the structural member of FIG. 4b in which the structural member is in an expanded or elongated configuration.

FIG. 5a illustrates a side view of two wall panels of the structure of FIG. 5.

FIG. 7a illustrates an expandable structural member after expansion where the structural member is in the form of a leg of a ladder.

FIG. 7b illustrates a rung of a ladder.

FIG. 7c illustrates a ladder built with the legs and rungs of FIGS. 7a and 7b, respectively.

FIG. 7d illustrates a partial section of the leg of FIG. 7c in a compact configuration as taken along line 7e-7e.

FIG. 7e illustrates the partial section of the leg of FIG. 7c in an elongated configuration.

FIG. 7f is a partial sectional view of the ladder of FIG. 7c as taken along line 7f-7f.

DETAILED DESCRIPTION OF THE PREFERRED EMBODIMENT

Expandable foams are well known in the art. Typically such foams are made by mixing two liquid parts, which react to form foam. Although, two parts are typical, one part expanding foams are also known in the art. The reaction of the two parts is usually exothermic. The resulting foams expand in volume from up to 30 times the volume of the liquid constituents. The liquids begin foaming almost instantly and can fully cure in a matter of minutes. However, both the beginning of foaming and the curing time can be varied with the addition of additives. Additives can also be added to make the resulting foam fire resistant or retardant. The resulting foams generally have good structural (compressive, tensile, shear, and flexural) strength and are also buoyant. For the most part, the resulting foams are closed cell and will resist absorption of water. Polyurethane is an example of a material of commonly used expanding foams. For example, a 2 lb density (per cubic foot) urethane foam has an expansion rate of 30 times the liquid volume, a buoyancy of 60 lbs per cubic foot, 40 psi parallel compressive strength, 30 psi tensile strength, 30 psi shear strength, and 50 psi flexural strength. A 4 lb density (per cubic foot) urethane foam has an expansion rate of 15 times the liquid volume, a buoyancy of 58 lbs per cubic foot, 90 psi parallel compressive strength, 110 psi tensile strength, 70 psi shear strength, and 120 psi flexural strength. An 8 lb density (per cubic foot) urethane foam has an expansion rate of 8 times the liquid volume, a buoyancy of 54 lbs per cubic foot, 250 psi parallel compressive strength, 225 psi tensile strength, 130 psi shear strength, and 350 psi flexural strength. A 16 lb density (per cubic foot) urethane foam has an expansion rate of 4 times the liquid volume, a buoyancy of 46 lbs per cubic foot, 580 psi parallel compressive strength, 450 psi tensile strength, 230 psi shear strength, and 750 psi flexural strength. The expansion rate and time are dependent upon the ambient temperature. The rates given above are for optimal conditions of 75-80 degrees F. Lower temperatures will hinder the expansion and time rates of the foam. Other density foams are available and can be tailored to a specific application.

Figure 1A:
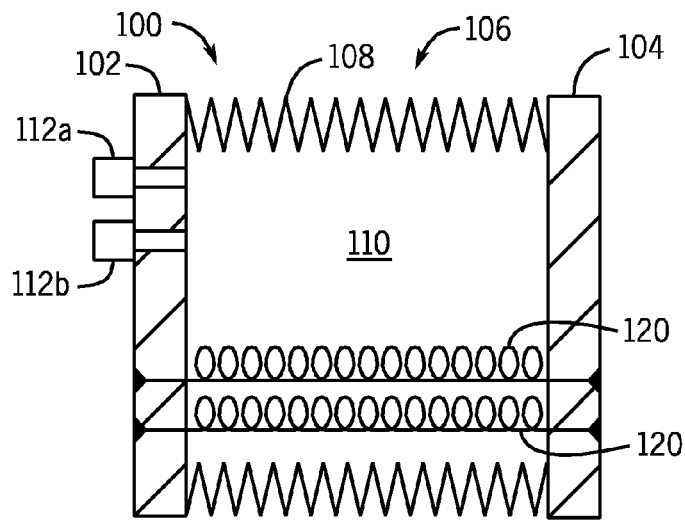
FIG. 1a illustrates an embodiment of an expandable structural member in a compact configuration.
Figure 1B:
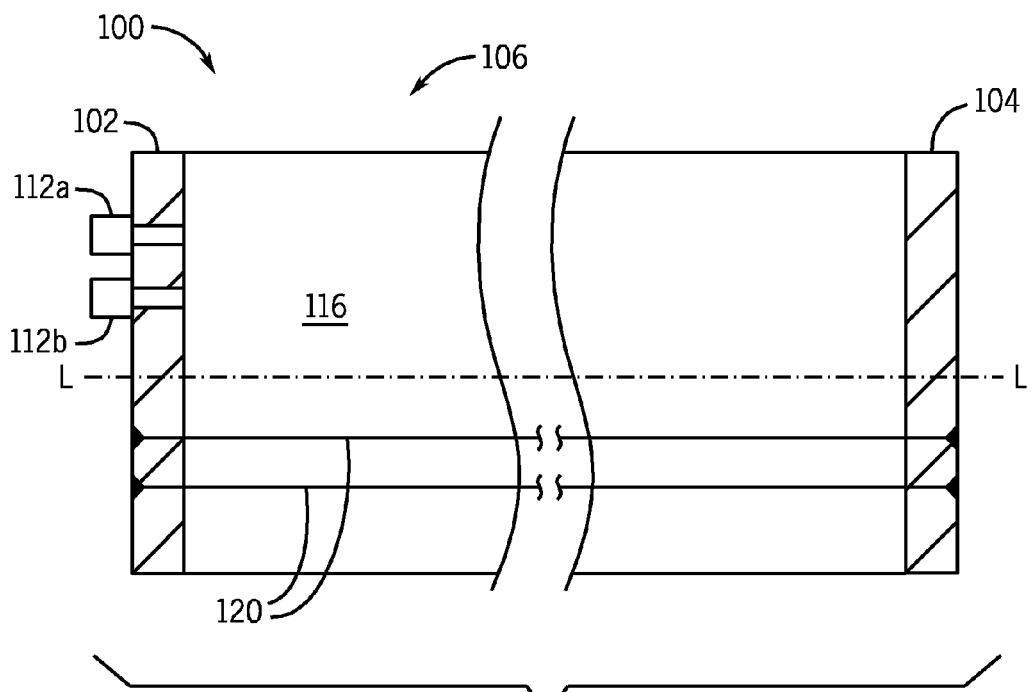
FIG. 1b illustrates the expandable structural member of FIG. 1a after expansion.

Referring now to FIGS. 1a and 1b, there is shown a structural member in the form of a beam, generally referred to by reference numeral 100. The beam 100 is shown in FIG. 1a in a compressed or compact form and shown in FIG. 1b in an expanded or elongated form. Referring to FIG. 1a, the compact beam has first and second endplates 102, 104 which can be formed from rigid or semi-rigid materials, such as plastics and/or metals. The shape of the endplates 102, 104 can be any cross-sectional shape known in the art for use as a beam, such as rectangular or I-beam shapes.

The beam 100 further has a covering 106 of a material that can be compressed, such as by pleating the same, shown schematically at 108. The covering 106 can be a woven fabric and/or polymer sheet, and can be bullet proof or resistant, such as ballistic nylon or woven Kevlar. The cover can also be elastic such that it can stretch to accommodate a change in length of the beam 100. Although the covering 106 is shown bridging the top and bottom of the endplates 102, 104 in the cross-section of FIG. 1a, it is assumed to bridge all sides of the endplates 102, 104 to define a cavity 110. At least one of the endplates 102 can have one or more inlets 112a, 112b for inputting at least expandable foam liquid(s) and possibly also a gas, such as air. The beam 100 does not need the endplates 102, 104 in which case, the covering may provide a means to close the cavity 110. Furthermore, the endplates 102, 104 do not have to extend along an entire width of the beam 100 and may be formed of multiple rigid or semi-rigid members, such as a plurality of grommets or washers formed on ends of the covering.

Figure 2:
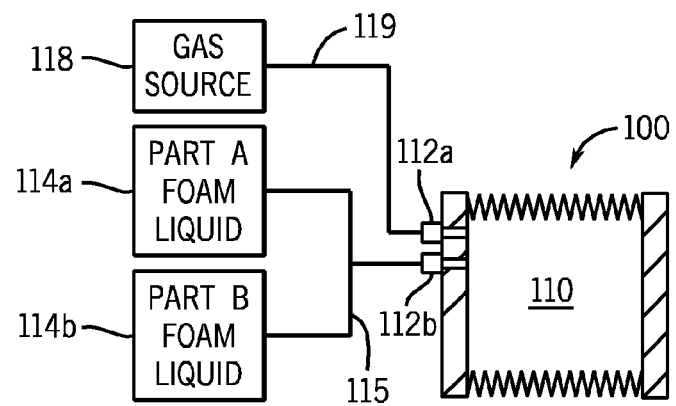
FIG. 2 illustrates a schematic of a system for expanding the structural member of FIGS. 1a and 1b.

Referring now also to FIGS. 1b and 2, the expanding foam liquid, which can be any of the two-part polyurethane's described above, is input into one of the inputs 112b from sources 114a, 114b (corresponding to each of the two parts (A and B) of the expanding foam) through suitable tubing 115.

The two parts are supplied to the inlet 112b and mixed to start a reaction therebetween. The mixing can take place at any time or location prior to entering the cavity 110 or at the entrance to the cavity 110. The mixing of two part expanding foam liquids is well known in the art. The expanding foam 116 fills the cavity 110 and causes the beam 100 to expand as shown in FIG. 1b. As discussed above, such expansion can be as much as 30 times the volume of the liquids. A gas, such as air, from a supply 118 can also be introduced into the cavity 110 via suitable tubing 119 through another of the inlets 112a (or through the same inlet 112b as the expanding foam liquids). The air can be used to pre-expand the covering 106 such that the foam is free to expand throughout the expanded cavity 110 and/or introduced during the introduction of the expanding foam liquids to propel the same away from the inlets 112a, 112b so that the foam fully fills the cavity and does not only fill the cavity 110 proximate the inlets 112a, 112b. The amount of expanding foam liquid introduced into the cavity 110 can be metered so that it does not underfill or overfill the cavity 110 after expansion. Valving and pumps or other delivery devices are not shown in the schematic of FIG. 2 for simplification and are assumed to be present to the extent that they are necessary. The covering 106 can have ribs (not shown) to prevent bulging of the cover due to the expansion of the foam. The bulging, if any, can be controlled with mechanical devices, such as forms of a roller for rolling the surface of the cover to spread the uncured foam evenly throughout the cavity.

After, the expanded foam is cured, the beam 100 can carry structural loads and be used with other structural elements to form a structure. The foam 116, as discussed above, can be made with any additive known in the art to tailor its properties, curing time, and other characteristics, such as being flame retardant. The resulting beam 100, as shown in FIG. 1b can also have tensile elements integrated therein for aiding in carrying any tensile loads that may be exerted on the beam 100. Such tensile elements can be wires 120 which are coiled or otherwise compressed (as shown in FIG. 1a) when the beam 100 is in its compact form and elongated (as shown in FIG. 1b) when the beam is in its expanded form. The wires 120 can be attached to each of the endplates 102, 104 by any means known in the art, such as brazing (as described below) or the like. The wires 120, in the elongated form, can help carry a tensile load exerted on the beam 100. Since beams generally are subject to tensile loads on a lower portion, the wires 120 can be provided only at a lower portion of the beam, as shown in FIGS. 1a and 1b. However, the beam must then be correctly oriented when used. Therefore, the beam 100 can also have wires 120 at both the top and bottom portions of the beam 100 such that orientation is not necessary. The wires can be any material that can carry a tensile load, such as metal or fiber. The wires 120 are best for carrying compressive stresses, e.g., on the top surfaces of beams or top panels and on the surfaces of columns when subject to buckling. These "wires" 120 are best to be flat strips, which are best to be oriented with the flat side pointing upwards. Then, as a compressive load is applied, the foam on the flat sides of the strip prevent its buckling, thereby allowing it to support compressive loads.

The wires 120 can also be a shape memory material that can change its shape upon being heated over a transition temperature. Such shape memory wires 120 can have a compact shape (such as a coil) in the compact configuration of FIG. 1a and can take a straight elongated shape upon being heated above its transition temperature. Upon taking the elongated shape, such shape memory wires 120 can exert a force to at least aid the expansion of the covering 106 during the introduction of the expanding foam in the cavity 100. The exothermic reaction of the foam can be used to heat the wires 120 over their transition temperature and cause the same to take the elongated shape that at least aids the expansion of the covering 106. The shape memory wires 120 can be used in place of or in addition to the introduction of the air into the cavity 110.

Figure 3:
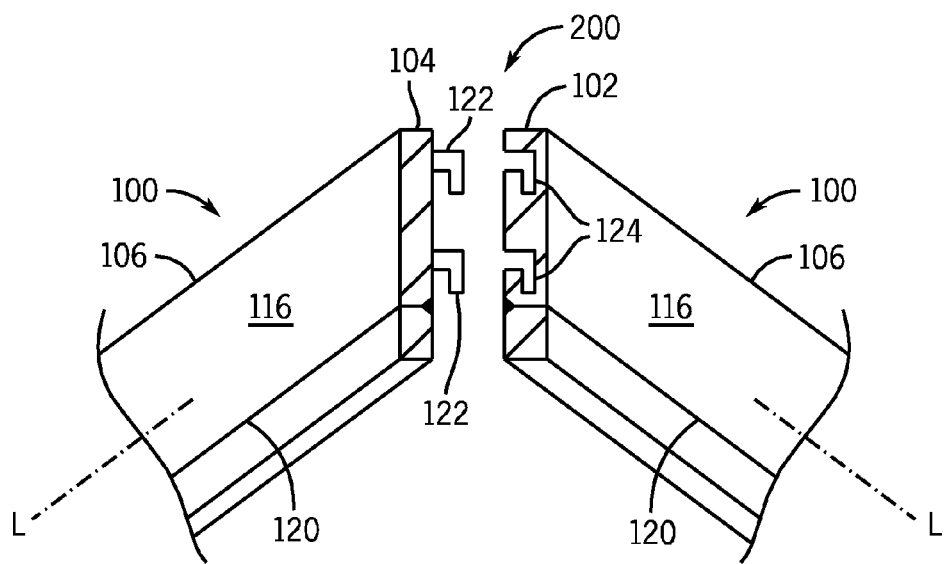
FIG. 3 illustrates a coupling for connecting structural members.

Referring now to FIG. 3, the same shows end portions of beams 100. However, such beams 100 have endplates 102, 104 which are non-perpendicular with respect to a long axis L of the beam 100 (unlike the beam of FIG. 1b in which the endplates are perpendicular with respect to the long axis L). The beams 100 of FIG. 3 are useful to form a truss when connected together end-to-end. Each of the beams 100 has an endplate 102 on one end (e.g., the left end) and each has an endplate 104 on the other end (e.g., the right end). The endplates 102, 104 have a means for interlocking by any means known in the art, such as one endplate 104 having one or more hooks 122 and the other endplate 102 having one or more corresponding latches 124. When the hooks 122 are engaged with the latches 124 the beams 100 are fastened together to form a truss assembly 200 (see FIG. 5). Many types of interlocking means are known in the art and will not be discussed herein for the sake of brevity.

Figure 4:
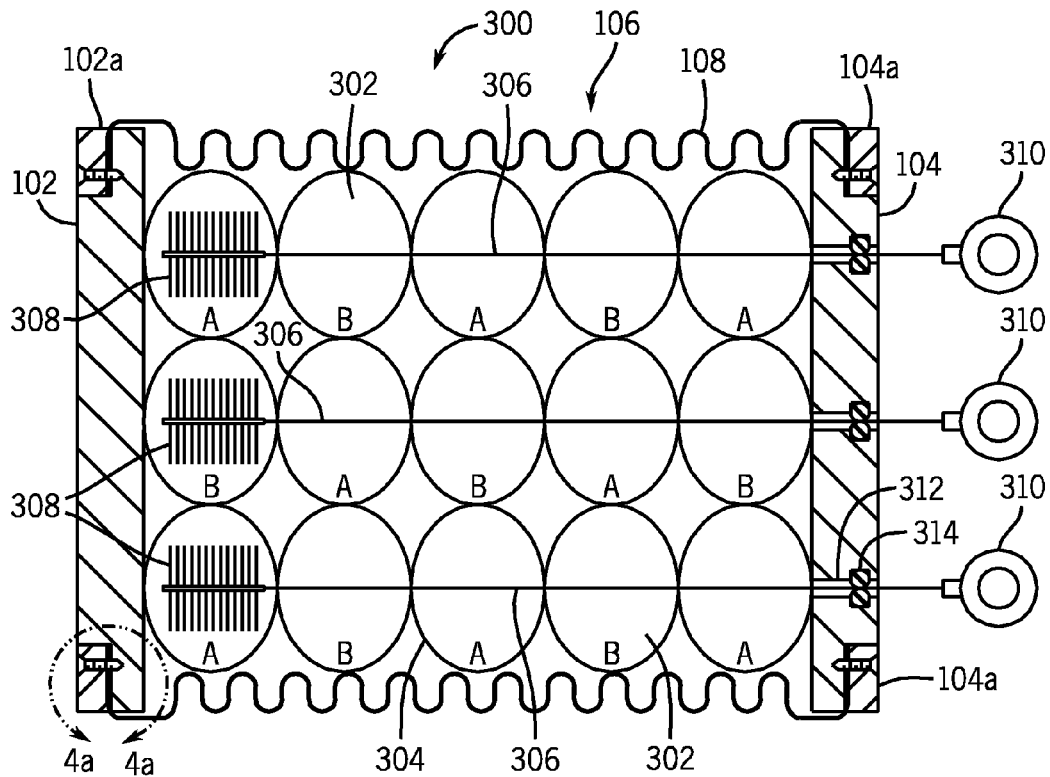

Referring now to FIG. 4, there is illustrated another embodiment of a structural member in the form of a beam, the beam being referred to by reference numeral 300 and being shown in the compact form in FIG. 4. The beam 300 of FIG. 4 is similar to that of FIGS. 1a and 1b except that the inlets 112a, 112b for introducing air and/or expanding foam liquid (s) are not necessary. In the embodiment of FIG. 4, the cavity 110 is filled with capsules 302 or packets of the expanding foam liquids, (the liquids referred to by reference letters A and B where A is one of the two parts of the expanding foam liquids and B is the other). The capsules 302 can be arranged side-by-side and can alternate horizontally and/or vertically as shown in FIG. 4. The capsules 302 have a skin 304 or enclosure for holding the liquids (A and B) therein, such as a thin film of plastic. The volume of the liquids (A and B) in the capsules 302 is that which is necessary to adequately fill the cavity 110 when the covering 106 is expanded. The number of capsules 302 is a tradeoff between the amount of mixing and complexity. The greater the number of capsules 302, the more likely the two parts (A and B) will sufficiently mix. However, a great number of capsules 302 also adds to the complexity of the beam 300.

The beam 300 of FIG. 4 also comprises a means for mixing the liquids (A and B) in the capsules 302. Such a means can rupture or otherwise break the skin 304 of the capsules 302 or chemically dissolve the skin or dissolve or otherwise breakdown the skin 304 with the application (or interruption of) of a magnetic field or current. In the latter configuration, the skin 304 may be a thin rheological material that is broken down (or liquefied) upon the removal of an applied magnetic field or current. In the embodiment of FIG. 4, the means for mixing the liquids comprises one or more cables 306 which are threaded through the capsules 302 and sealed at the skins 304 to the cable 306. Preferably, the capsules 302 are formed on the cable 306 as a "necklace" and disposed in the cavity 110. The cable 306 has a mixing means formed at one end thereof, such as an auger or brush 308 that will facilitate mixing of the liquids (A and B) as it is moved through the capsules 302. Although each cable 306 is shown with a single brush 308, two or more may also be provided spaced along the length of the cable 306. Another end of the cable can have a finger loop 310 or other means for providing a grip of the cable 306. One of the end plates 104 has through holes 312 corresponding to each of the cables for exposing an end of the cable 306 on an exterior of the endplate 104. The through holes 312 can have a sealing means, such as an o-ring 314 for preventing leakage of the liquids (A and B) and/or the expanding foam from the cavity 110. When expansion of the structural member, such as the beam 300 is desired, the one or more cables 306 are grasped, at the finger loops 310 and pulled in the direction of Arrow A to rupture the capsules 302 and to drag the mixing means 308 through the capsules to facilitate the mixing of the liquids (A and B). The mixture of the liquids (A and B) results in an expanding foam and the expansion of the beam 300 into its expanded configuration. After curing of the foam, the beam 300 can be used alone or in combination with other structural members to form a structure.

Figure 4A:
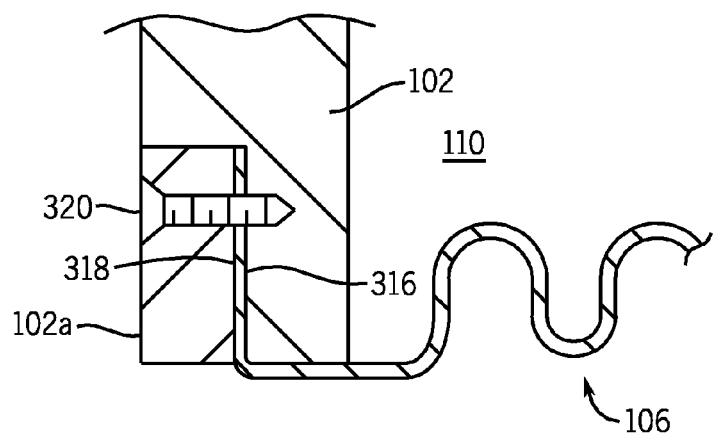
FIG. 4a illustrates an enlarged view of a portion of the structural member of FIG. 4.

During assembly of such a beam 300, one endplate 102 and the covering 106 are fastened together by any means known in the art, such as by adhesives or with the use of a securing frame 102a (shown clearly in FIG. 4a). The covering 106 is sandwiched between a surface 316 of the endplate 102 and a surface 318 of the securing frame and secured with a fastener, such as a screw 320, a solvent, or an adhesive. The cable 306 and capsule 302 "necklaces" are laid in the cavity 110 with the mixing means being proximate to the endplate 102 and without the finger loops 310. The other endplate 104 is then secured to the covering by any methods known in the art, such as with a securing plate 104a similarly to that described with respect to endplate 102 and securing plate 102a. The cable ends are threaded through their corresponding holes 312 upon placement of the endplate 104 and the finger loops 310 are placed on the cable ends by any means known in the art, such as by tightening set screws (not shown) in the body of the finger loops 310 against the cable end. A means can be provide to prevent an accidental pulling of the cables 306 before the beam 300 is desired to be expanded, such as a cover plate or film (not shown) disposed over the endplate 104 and finger loops 310.

The structural member 300 of FIG. 4 can be configured to also have tensile elements integrated therein for aiding in carrying any tensile loads that may be exerted on the beam 300 similarly to that described above with regard to FIGS. 1a and 1b. As shown in FIG. 4b, such tensile elements can be wires 120 which are coiled or otherwise compressed when the beam 300 is in its compact form and elongated (as shown in FIG. 4c) when the beam 300 is in its expanded form. Although FIGS. 4b and 4c illustrate one such wire 120, more than one can be provided as discussed above. Furthermore, the wires 120 can be provided at a lower portion of the beam 300, which is subjected to a tensile load or the wires 120 can be provided at both upper and lower portions of the beam 300 such that orientation of the beam 300 is not necessary. As discussed above, the wires 120, in the elongated form, can help carry a tensile load exerted on the beam 300. The wires 120 can be any material that can carry a tensile load, such as metal or fiber, and may be a shape memory material as discussed above. One end 120a of the wires 120 can be attached to the endplate 102 by any means known in the art, such as by being disposed in a corresponding hole 120b in the endplate 102 and brazing 120c or otherwise fastening the wire to the endplate 102. Another end 120d of the wire 120 is attached to an end 306a of a cable 306. A fitting 322 can be disposed at a transition between the wire 120 and the cable 306. The fitting 322 is fixed to the cable 306 and/or wire 120 such that its movement along the wire and cable is fixed by any means known in the art. Upon pulling the cable 306, the cable 306 and mixing means 308 functions as discussed above, and the fitting 322 is pulled towards the other endplate 104 until the fitting 322 locks into the other endplate 104. The fitting 322 can lock into the other endplate 104 by any means known in the art such as a snap fit. In such a snap fit, the fitting 322 is capable of plastically deforming facilitated by a slit 324 and a corresponding receptacle 326 on the endplate 104. The receptacle 326 has a large bore 328 that accommodates a tapered nose portion 330 of the fitting 322. The receptacle 326 also has a cover plate 332 having a smaller diameter bore 334. The cover plate 332 can be integral with the endplate 104 or separate therefrom and fastened to the endplate 104, such as by screws 333. The fitting 322 is pulled such that the tapered end portion 330 is plastically deformed by the smaller diameter bore 334 until the same passes through the small diameter bore 334 and is disposed in the large bore 328 where it is captured as shown in FIG. 4c. The fitting 322 can be made of any material that is easily deformable yet strong, such as a plastic, however, metals can also be used if the fitting 322 is configured properly to mechanically deform with the use of the slit 324 or with multiple slits. Once the fitting 322 is captured in the receptacle 326, the wire 120 is configured similar to that described in FIGS. 1a and 1b, in that it can elongate along with the expansion of the beam 300 or aid in the expansion of the beam 300 if fabricated from a shape memory material, as described above. The assembly of the beam 300 having the tensile elements integrated therein is similar to that described above with regard to FIG. 4, however, the cable 3062 and capsule 302 "necklaces" are formed with the coiled wire 120 and fitting 322 attached thereto. The end 120a of the wire 120 is inserted into corresponding holes 120b in the endplate 102 and fastened thereto by any means known in the art, such as brazing 120c. The other endplate 104 is then connected as discussed above with the receptacle(s) 326 corresponding to the cable(s) 306 having the coiled wire 120 and fitting 322.

Figure 5:
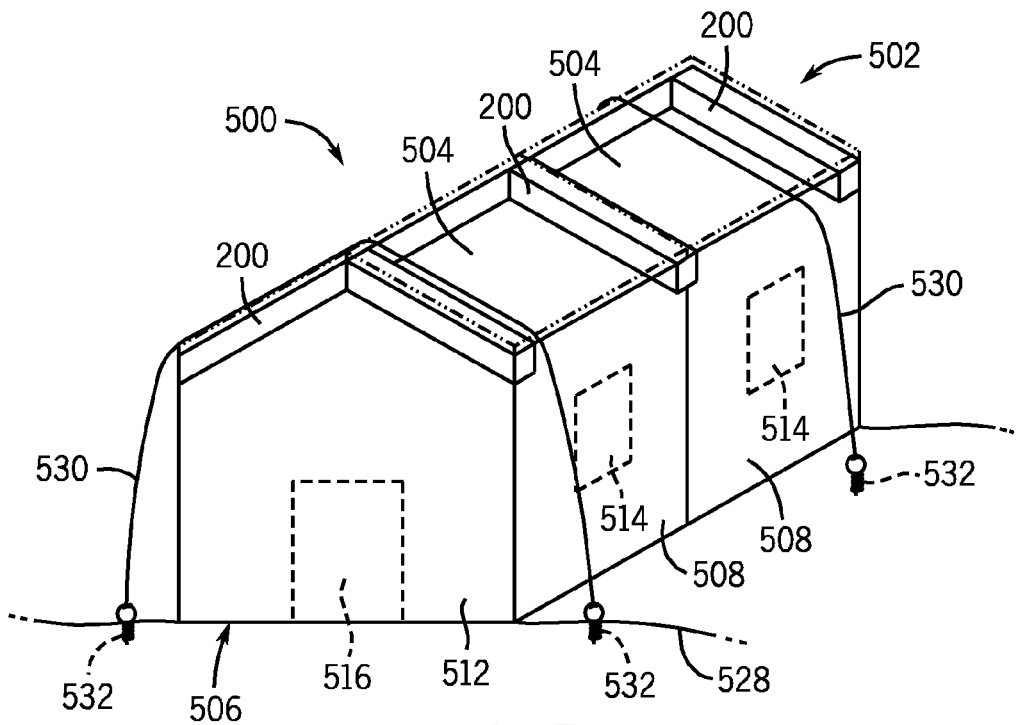
FIG. 5 illustrates a structure built with expandable structural members and panels.

Referring now to FIG. 5 there is shown a structure, generally referred to by reference numeral 500 in which at least one component of which was made from an expanding foam. The structure 500 of FIG. 5 illustrates an enclosed structure that could house people or can be used for storage, however, the same can be open on one or more sides and be used in various other ways, such as an aircraft hanger. Furthermore, although the structure 500 can have a temporary nature, the same can also be converted into a permanent structure, such as by finishing an interior thereof with plumbing, electrical, interior walls and the like and/or an exterior thereof, such as with stucco or siding.

The structure includes several truss assemblies 200 as shown in FIG. 3 to support a roof 502 (shown in dotted lines) comprised of several roof panels 504. The structure 500 also includes two or more walls 506 supported by the ground or other supporting structure. Each of the side walls can comprise one or more individual wall panels 508. The roof and wall panels 504, 508 can be configured similarly to the structural members of FIGS. 1a, 1b, and 4 except they may have a greater width. For example, such roof and wall panels 504, 508 can have an elongated length of 8 feet and a width of 4 feet to resemble a standard 4×8 panel typically used in construction. The panels can interlock by any means known in the art, such as the hook and latch arrangement described with respect to FIG. 3 and/or any other means such as screw, bolts and/or adhesives. The panels can further have a cut-out 510 in each of its two upper corners for accommodating the individual beams 100 of the truss assemblies 200. The cut-out 510 can be the same depth (X1) of the beam and ½ the width (X2/2) such that when two wall panels 508 are butt together as shown in FIG. 5a, two cut-outs 510 are disposed next to each other to form a channel that is equivalent to the depth (X1) and width (X2) of the beam 100 to accommodate the same within.

The beams 100 can be press fit within the cut-outs 510 and/or secured with adhesives, screw, bolts, or any other means known in the art. End wall panels 512 can be sized to fit within the shape defined by the wall panels 508 and truss assembly 200 using one such shaped panel or several which conform to the shape when assembled. The end-wall panels 512 can be secured to both the adjoining wall panels 508 and truss assemblies by any means known in the art, such as adhesives and/or screws, bolts and the like. The roof panels 504 can also be secured to the truss assemblies 200 by any means known in the art, such as adhesives and/or screws, bolts and the like.

Figure 5B:
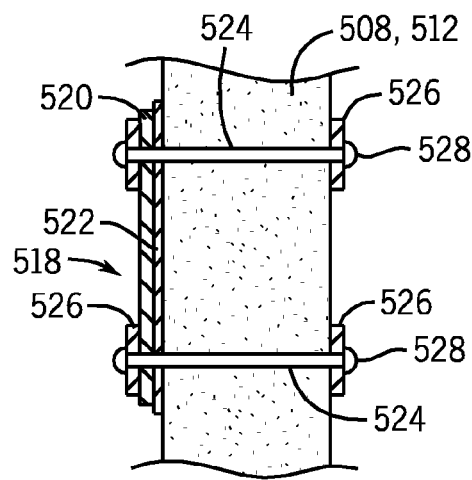
FIG. 5b illustrates a partial sectional view through a wall/end wall panel of the structure of FIG. 5 proximate an opening.

After assembly, gaps (if any) between components in the structure 500 can be sealed by any means known in the art, such as with caulking or expanding foam. The wall and end wall panels 508, 512 can be provided with window and door openings 514, 516, respectively such that openings for the same are provided in the covering 106. However, such openings can also be easily cut in the wall and end-wall panels 508, 512 after the same have cured with conventional tools such as a hand saw (or an electric carving knife). Conventional windows and doors can then be directly disposed in the openings 514, 516 and secured to the wall and end wall panels 508, 512 by any means known in the art, such as adhesives, screws and/or bolts. Such windows and doors, a portion of which is shown in FIG. 5b and referred to by reference numeral 518, can have a flange 520 that overlaps at least two sides, and preferably each side of the opening 514, 516. An adhesive or caulking 522 is disposed between the flange 520 and the wall/end wall panel 508, 512. Fasteners, such as bolts 524 can then be disposed through the flange 520 and wall/end wall panel 508, 512 with large diameter washers 526 at each end and secured with a mating nut 528. Similar methods can be used to fasten the roof panels 504 to the truss assemblies 200 or any other two components together. The openings 514, 516 can also be trimmed with wood around an interior periphery of the openings 514, 516, which can be fastened by any means known in the art, such as adhesives, screws and the like, and the windows and doors 518 can be fastened to the wood in a conventional manner as is known in the construction arts.

When assembling a structure 500 with elements, intermediate elements can be assembled first in place, and then pressurized (if applicable) and then the foam can then be released. After the structure is assembled, one may add frames or other sturdy structural elements such as columns or beams (aluminum or steel or the like) to make a much stronger structure. The latter elements may be added at a later time. Then the expandable structure acts mostly as the outer skin of the structure. Alternatively, a basic frame may put up first and then the expandable elements be added to it.

Figure 5C:
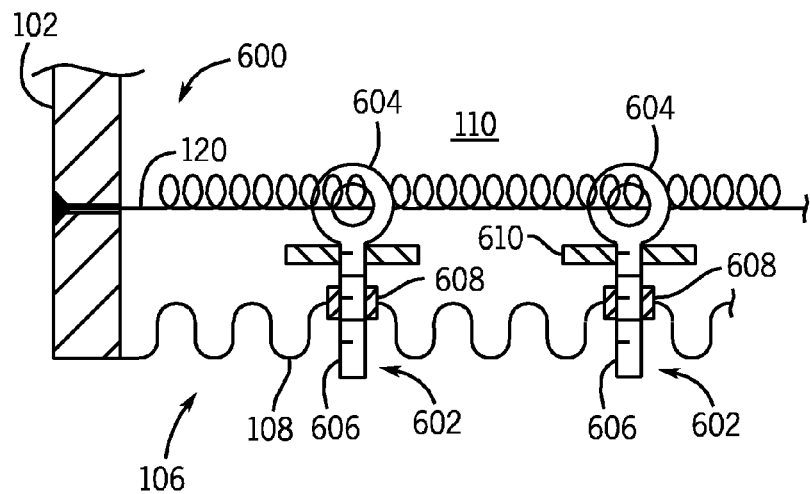
FIG. 5c illustrates an expandable structural member having bolt fasteners integral therein, the expandable structural member being in a compact configuration.
Figure 5D:
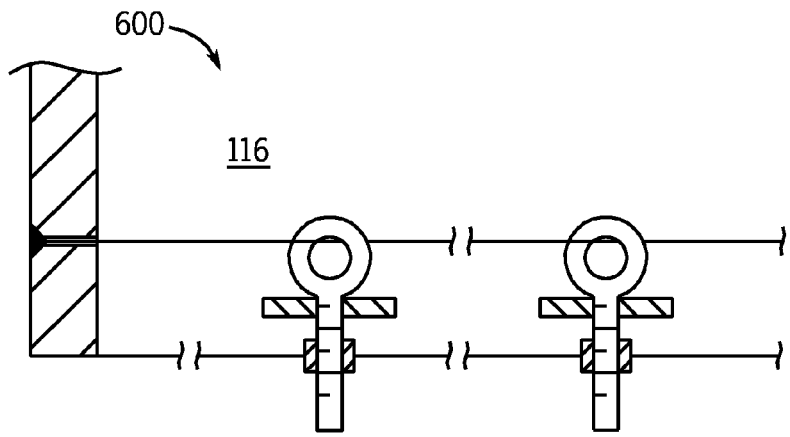
FIG. 5d illustrates the expandable structural member of FIG. 5c after expansion.
Figure 5E:
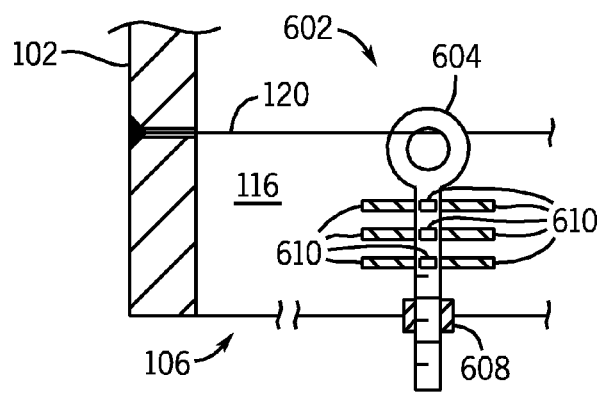
FIG. 5e illustrates an alternative embodiment of the bolt fasteners of FIGS. 5c and 5d.

As discussed above, any of the components discussed above which makes up the structure 500 can be secured to another component by adhesives, screws, bolts, and any other means known in the art, such as the hook/latch mechanism shown in FIG. 3. Referring to FIGS. 5c and 5d, there is shown a structural member, generally referred to by reference numeral 600, which is similar to beam 100, but can be any structural member formed by expanding foam. Such structural member 600 includes bolt fasteners 602, which after expansion of the structural member 600, protrude from a surface thereof and are secured in the foam 116. Although the bolt fasteners 602 are shown on an end surface, they can be positioned on any expanding surface of the structural member 600 and at any location on such surfaces. Furthermore, such an arrangement may be particularly useful on the edges of openings 514, 516 for attachment of windows and doors and/or on the truss assemblies 200 for fastening the same to the roof panels 504. The bolt fasteners 602 are typically metal or strong plastic and have a loop 604 on one end thereof through which the wire 120 is threaded. The bolt fasteners 602 have another threaded end 606 which are threaded and protrude from the covering 106 through a grommet 608 for sealing around the bolt fastener 602. An o-ring or other sealing means may also be disposed in the grommet corresponding to a non-threaded portion of the bolt fastener. As shown in FIG. 5d, during elongation of the structural member 600, the bolt fasteners 602 move with the expansion, guided by both the wire 120 and grommet 608. After curing, the bolt fasteners 602 are secured in the foam 116 and can be used to secure other components or articles thereto. One or more projections 610 can be added to the bolt fasteners 602 at a location corresponding to the cavity 110 to increase their footprint and ensure that they cannot be easily pulled from the cured foam 116. Referring now to FIG. 5e, there is shown an alternative embodiment of the bolt fastener 602 having a plurality of projections 610. The projections 610 being paddle shaped and disposed about the bolt fastener 602 to resist pulling of the bolt projection from the cured foam 116.

The structure 500 can be secured to the ground 528 or other surface by one or more cables 530 slung over the roof 502 and secured to the ground 528 or other surface, such as by corkscrew stakes 532 as is known in the art. Those skilled in the art will appreciate that such a structure 500 can be assembled in a short time (rapidly deployed), with nothing but the simplest hand tools (with a minimum of labor), and require no maintenance to maintain the stability thereof. The resulting structure 500 can also be lightweight, bullet proof/resistant, fire retardant/resistant, insulated from temperature extremes, and opaque to the sun's ultra-violet exposure. Those skilled in the art will appreciate that the span of the truss assemblies 200 can be very long, making for a spacious interior without the need for posts since they are light weight and strong and they only support lightweight roof panels 504. Therefore, such a structure can house large objects, such as aircraft without the interference of posts and other support members. If posts are needed to support very long spans, the same can also be expanded using a structure similar to that shown in FIGS. 1a and 1b. Such posts can have any cross-section, such as square or round and do not require wires 120 since they do not carry a tensile load. However, wires 120 may be used where the posts are very long to resist buckling generated tensile loads.

Figure 6:
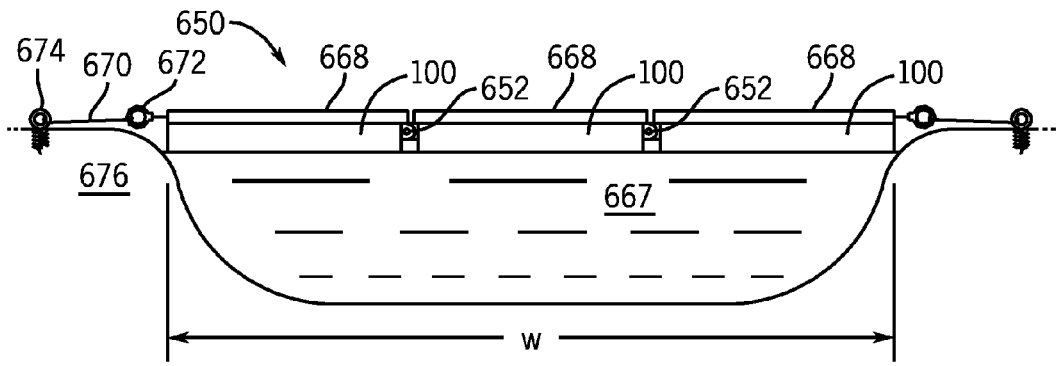
FIG. 6 illustrates a bridge structure built with expandable structural members and panels.
Figure 6A:
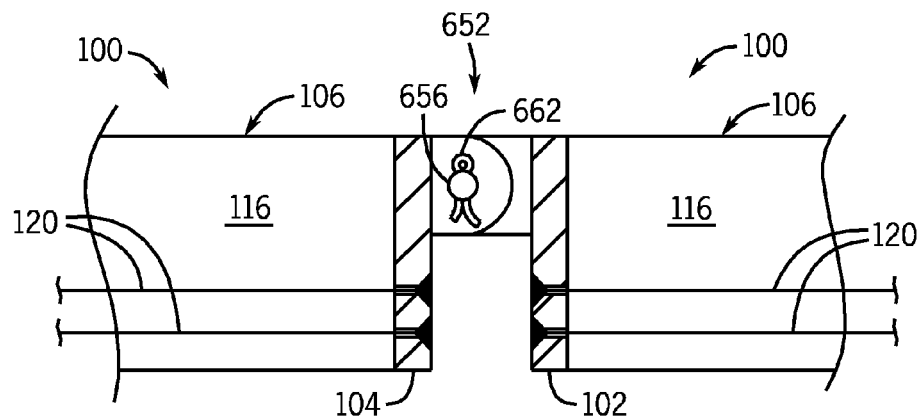
FIG. 6a illustrates a side view of two adjacent ends of beams of the bridge structure of FIG. 6 having a rotatable joint therebetween.
Figure 6B:
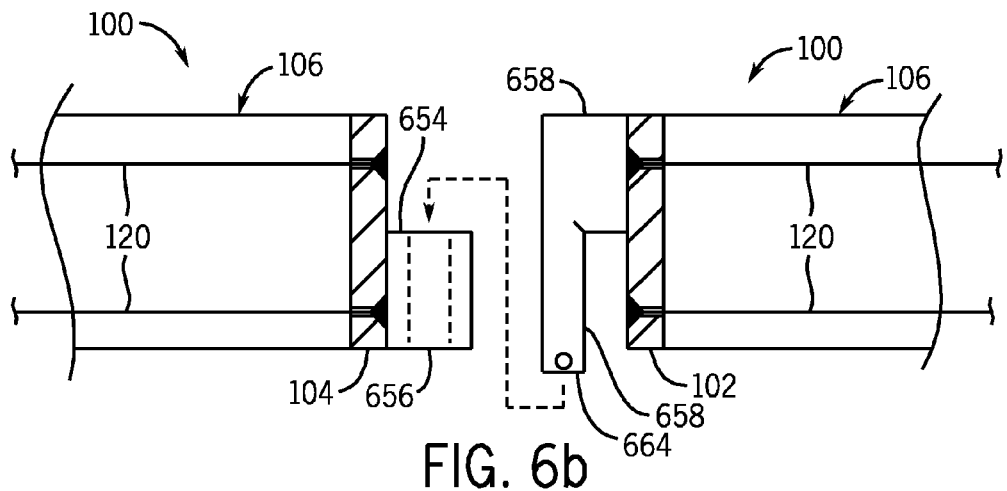
FIG. 6b illustrates a top view of the two adjacent ends of the beams of FIG. 6a before assembly thereof.

Referring now to FIG. 6, there is shown a side view of an expandable structure in the form of a flotation bridge generally referred to by reference numeral 650. The flotation bridge (pontoon) is constructed from one or more expandable beams, similar to that shown in FIGS. 1a and 1b. Such beams 100 can be linked together to span longer widths W, by any means known in the art, such as the hook and latch arrangement of FIG. 3. However, an alternative means to link the individual beams 100 together may include a pivot 652 where one of the endplates 104 has a projection 654 with a bore 656 and the other endplate 102 has a projection 658 with a mating shaft 660. When linking the beams 100 together, the shaft 660 is disposed in the bore 656 and the shaft is rotatably secured therein by any means known in the art, such as by placing a cotter pin 662 in a hole 664 at the end of the shaft. Such an arrangement will allow for fluctuations in height between beams caused by the water 667 and/or unequal loading of the bridge 650. The pivot joint can also be used in the configuration of FIG. 3 to attach the beams 100 together. However, such joint would be positioned on a lower portion of the endplates 102, 104 such that a load on the truss assembly 200 would tend to close the endplates 102, 104 together.

Two or more of such beams 100 are arranged across the width W of the water 667 substantially parallel to each other.

Panels 668, similar to those described above with regard to FIG. 5 (e.g., 4×8 expandable panels) are then laid on top of the beams 100 and can be secured thereto by any means known in the art or described above, such as an adhesive, and/or other fastener such as the bolt fasteners described with regard to FIGS. 5c and 5d. The bridge assembly 650 can then float on the surface of the water due to the exceptional buoyancy of the expanded foam 116 in the cavities 110 of both the beams 100 and panels. Using a buoyancy of 46 pounds per cubic foot (as discussed above) each 4×8 by 1 foot thick panel has a buoyancy of 1,1104 pounds. Therefore, a flotation bridge 650 having several panels 668 and beams can support significant amounts of personnel as well as light machinery. The flotation bridge 650 can be secured with cables 670 secured at one end to an eyehook 672 and at another end to a corkscrew stake 674 secured to the ground 676. The eyehook 672 can be mounted to either the endplate 102, 104 of the panels 658 and/or beams 100 such as by providing a threaded hole on the endplates 102, 104 and a mating threaded stud on the eyehook 672. Several of such cable arrangements can be provided to secure and stabilize the flotation bridge 650. Although not shown, ramps having tapered endplates may be provided at each end of the flotation bridge to make for a smooth transition between the ground 676 and the panels 658. Such tapered ramps may also be constructed similarly to the structural members 100 shown in FIGS. 1a, 1b and 4 in which the same is expanded. Although expandable panels would provide greater buoyancy, the panels can be any conventional materials such as wood, plastics or cement.

Referring now to FIGS. 7a, 7b, 7c, 7d, 7e and 7f there is illustrated an expandable structure in the form of a ladder, which is generally referred to by reference numeral 700. The ladder is comprised of two expandable structural members 702, which carry rungs 704. Although the rungs 704 can also be expandable, they are preferably formed out of a solid material, such as wood, plastic or metal, since they are essentially compact in their solid form and can carry a greater load in such form. Although shown having a circular cross section, the rungs can have any other cross section known in the art. The structural members 702 are configured similarly to that of the beams of FIGS. 1a, 1b and 4 with endplates 102, 104, covering 106 and possibly wires 120. The wires 120 are utilized because when placed at an angle against something to be climbed, the portion of the structural members 702 facing the thing to be climbed is in tension and such wires 120 aid in carrying the tensile load therein. The structural members 702 further has grommets 706 disposed in or on the covering 106 and preferably spaced at equal intervals for supporting the rungs 704.

Referring now to FIGS. 7d and 7e, the grommets 706 have a bore 708 for accommodating the cross-sectional shape of the rungs (at least at the ends of the rungs which may differ from the cross-sectional shape of a central portion of the rungs). The bore 708 can be a blind hole or through hole as shown in FIGS. 7d and 7e. The grommets 706 preferably have a flange 710 on each side thereof for overlapping with the cover 106. The cover 106 is preferably attached to the grommet 706 at the flange 710 by any means known in the art, such as by adhesives, heat-sealing, or fasteners. One of the flanges 710 can be separate from a body 712 of the grommet 706 and attached by any means known in the art, such as by mating threads 714 to facilitate assembly of the grommets 706 to the cover 106. In addition to the wires 120 used for carrying at least a portion of any tensile load carried by the structural member 702, wires 716 can also be used between the endplates 102, 104 and adjacent grommets 710 and between adjacent grommets 710. Such wire 716 is useful to assist in carrying a load applied to the rungs 702. After expansion of the structural member 702, the foam 116 will envelope each of the grommets 706 and secure it in place. If not for the wires 716, any load applied to the rungs 704 is carried in compression by the foam between adjacent rungs 704. However, with the addition of the wires 716, a large portion of any load applied to a rung 704 is carried by the wires 716 in tension. The wires 710 can be attached to the endplates as described above and can be attached to the grommet body 712 by any means know in the art such as by brazing. Alternatively, the wire can be one piece and may simply be wound one or more times around each grommet 706.

After expansion of two structural members 702, which act as legs of the ladder 700, the ends 704a of the rungs are inserted into the bores 708 of the grommets 706 to form the ladder 700. The rung ends 704a may be press fit into the bores 708 or have some type of positive locking means such as that shown in FIG. 7f. FIG. 7f shows the rung end 704a having a step 704b and a hole 704c with a cotter pin 718 being disposed in the hole 718 to positively retain the rung 704 in the bore 708 of the grommet 706. After assembly, the ladder 700 can be used to climb up or down and since the same is buoyant, the ladder 700 can also float on water and support the weight of a person crossing the water. If the ladder is configured similarly to that shown in FIG. 4, the same can be compact enough to be carried in a backpack of a person and can expand up to 30 times the compact size. Although not shown, additional items can be attached to the endplates, such as footings on the bottom endplates or cushions on the top endplates, as is known in the art. Such items can be attached by any means known in the art, such as adhesives, screws or bolt fasteners.

Figure 8A:
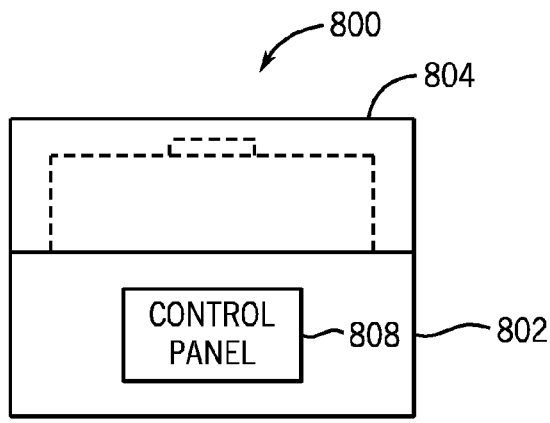
FIG. 8a illustrates a front view of an after expandable electronic device before expansion.
Figure 8B:
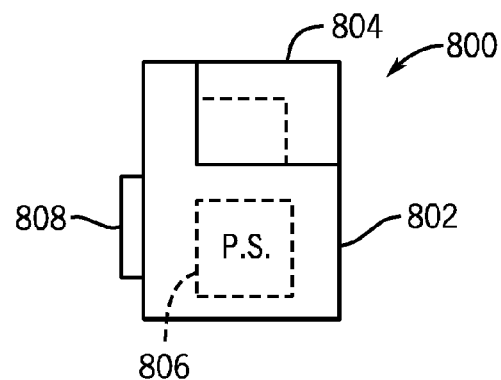
FIG. 8b illustrates a side view of the electronic device of FIG. 8a before expansion.
Figure 8C:
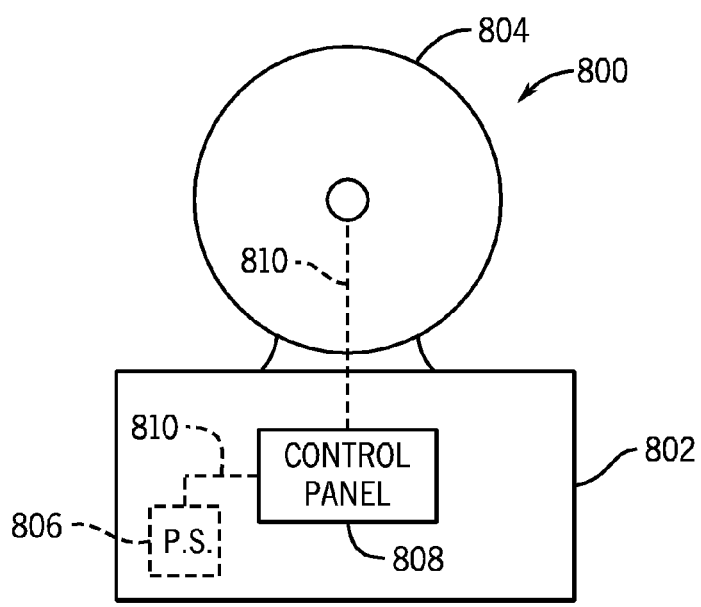
FIG. 8c illustrates the electronic device of FIGS. 8a and 8b after expansion.

Referring now to FIGS. 8a, 8b, and 8c, there is shown an electronic/electrical device which can be expanded using the expandable foams discussed above, the device being referred to by reference numeral 800. Although such device 800 is shown and described as a communication device, such is shown by way of example only and those skilled in the art will appreciate that the electrical/electronic devices can take many forms, such as a microwave oven, or scientific equipment. The device 800 is shown in its compact form in FIGS. 8a and 8b in front and side views, respectively, such that it can be easily carried by a person, such as in a backpack. The device can be made to expand similarly to the structural member 100, 300 of FIGS. 1a, and 4, respectively. The device has a body portion 802 and an antenna dish portion 804, which after expansion, unfolds from the body portion 802 as shown in FIG. 8c. The body portion 802 has embedded or disposed thereon a power supply 806 and electronics used for operation of the device, shown schematically in the form of a control panel 808. The control panel 808 is electrically connected to the power supply 806 and the antenna dish 804 with wiring 810 that can expand with the component portions, such as being coiled. The power supply 806 could be a battery. However since batteries have a limited shelf life, the power supply 806 can also generate power from the environment such as a photovoltaic cell, or thermophotovoltaic cell that can supply power directly to the electrical/electronic components or for storage in a storage device, such as a battery or a capacitor. In the case of a thermophotovoltaic cell, the same can generate power from the exothermic heat from the foam reaction. Such power can be supplemented by other power sources. Other components, if sensitive to heat, can be insulated from the exothermic heat generated by the foam reaction to avoid damaging the same.

Figure 9A:
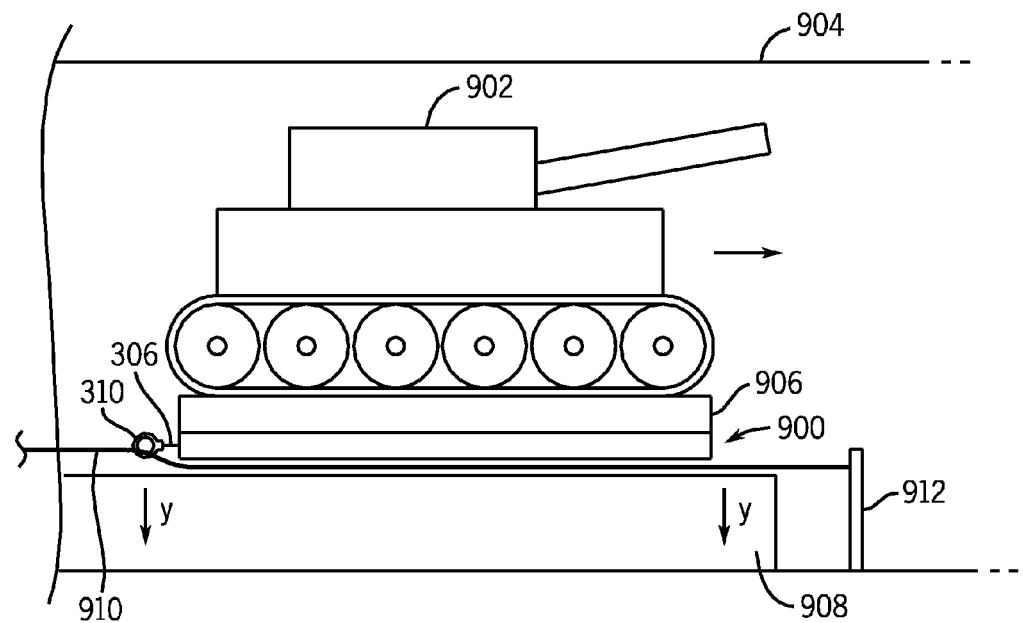
FIG. 9a illustrates a tank loaded in a cargo bay of an aircraft having an expandable member at a lower surface thereof.
Figure 9B:
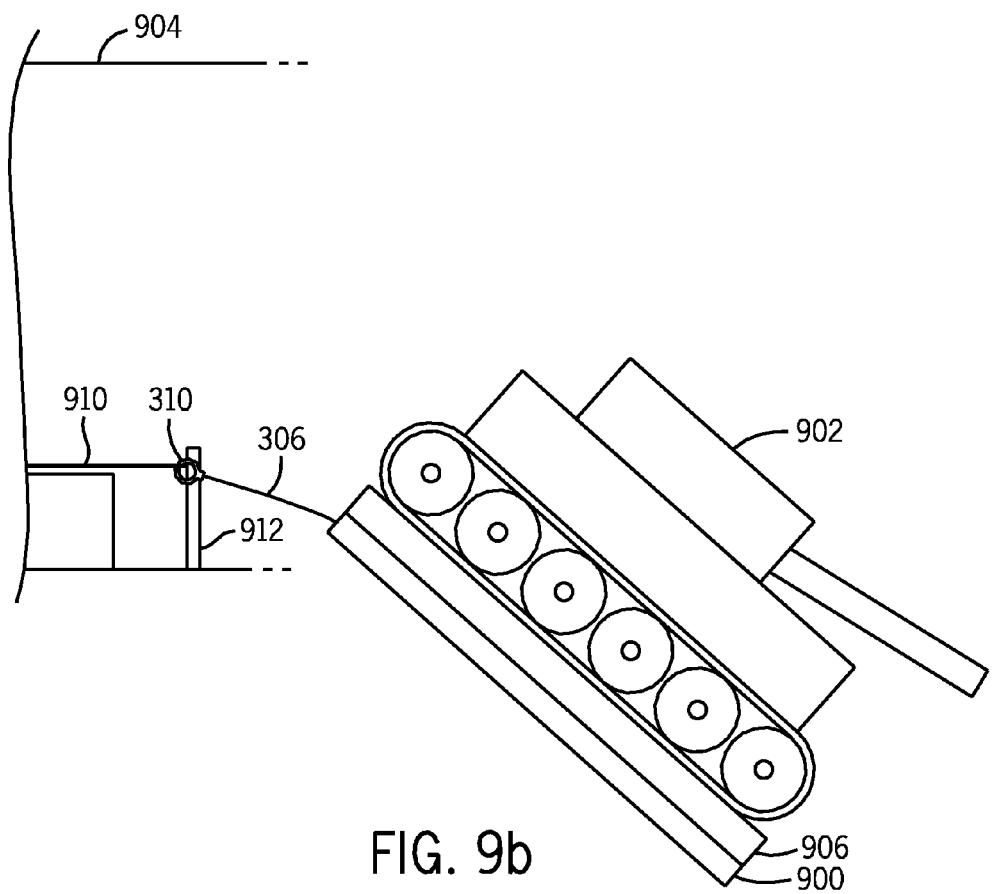
FIG. 9b illustrates the tank of FIG. 9a being deployed from the aircraft.
Figure 9C:
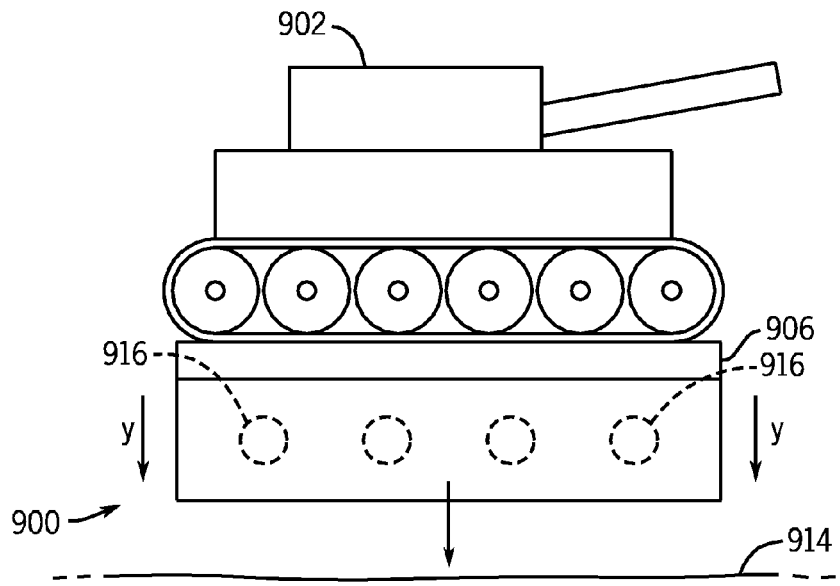
FIG. 9c illustrates the tank of FIGS. 9a and 9b before it impacts a surface with the expandable member being expanded.

Referring now to FIGS. 9a, 9b, and 9c, there is shown an expanding member for use with dropping machinery for at least partially absorbing an impact of the machinery with a surface, such as the ground (or water), the member being generally referred to by reference numeral 900. Although, the member 900 is shown and described with regard to dropping a tank 902 from the fuselage of an aircraft 904, such is given by way of example only. Those skilled in the art will appreciate that any type of object or machinery can be dropped utilizing member 900 from a height onto a surface. Although not shown, the tank 902 can also have a parachute or like device for decreasing its velocity upon impact with the surface.

The tank 902 is shown as being secured to a pallet 906 or like article as is known in the art which is movable upon a base 908, such as a rail for guiding the tank 902 towards an open end of the fuselage. The member 900 is attached to the pallet 906 at a lower end thereof, but may also be attached to other surfaces of the pallet 906, such as a side thereof or to the tank itself. The means for attachment can include a flange or adhesive. Attachment of the member 900 to the pallet 906 may also include integrally forming the member 900 with the palette 906. The member 900 can be constructed as shown in FIG. 4 having a plurality of capsules 302, a cable 306 with mixing means 308 and a loop 310. The member may be constructed with or without one or both of the endplates 102, 104. The member 900 is configured such that expansion thereof will occur in the direction indicated by arrows y. The aircraft 904 further has a drop cable 910, which is threaded through the loop 310. The drop cable 910 terminates at a post 912 proximate the opening in the fuselage such that it does not impede the progress of the tank 902 and palette 906 toward the open end or from the open end. Although one member 900 is shown two or more can be disposed on each of the two sides of the palette 906 and/or along a lower surface of the palette 906. In such a configuration, a drop cable 910 can be provided for each member 900 or a single drop cable 910 can be linked to each of the loops 310 corresponding to each member 900.

Referring now to FIG. 9b, as the tank 902 with attached palette 906 is advanced through the opening in the fuselage, the post 912 and drop cable 910 capture the loop 310 to prevent its forward progress thereby causing a relative movement of the cable 306 and the member 900. The cable 310 can be completely withdrawn from the cavity 110 or the loop 310 can fail and release from the post 912 after the cable 310 is fully withdrawn through the cavity 110. Such relative movement between the cable 310 and member 900 causes the capsules 302 containing the two parts (A and B) of expanding foam to rupture and mix, initiating the reaction thereof. The initiation of the reaction can be delayed by extending the distance between the loop 310 and the member 900. As shown in FIG. 9c, the member expands in the y direction prior to impact of the tank 902 with the ground 914 or other surface. An additive can be added to the capsules such that the foam 116 in the cavity does not fully cure (and harden) prior to impact. However, the combination of cold temperature at the altitude of the drop along with the expected drop times should not necessitate the addition of such additives. However, such additives may be used to provide maximum expansion without appreciable hardening of the foam. Upon impact, the covering 106 can fail such that the uncured foam can be released from the cavity 110 to absorb the impact. Perforations 916 can be provided in the covering 106 to facilitate and/or control such failure. Relief valves can also be provided in the covering 106 to allow the uncured foam to escape the cavity 110 upon impact in a controlled manner. Such relief valves can be simple spring valves with ball seats that are disposed in the covering similarly to the grommets 608 discussed above. If the surface 914 is water, additives may be added to the capsules to accelerate curing of the foam so that the member is fully buoyant upon impact with the water surface. Alternatively, the tank 902 or other object can be at least partially submerged in the water after impact and can rise to the surface upon full expansion and curing of the foam in the member(s) 900. Thus, a member useful for reducing the impact with the ground and/or providing buoyancy upon impact with a water surface can be provided which does not occupy additional space in the fuselage of an aircraft.

Figure 10A:
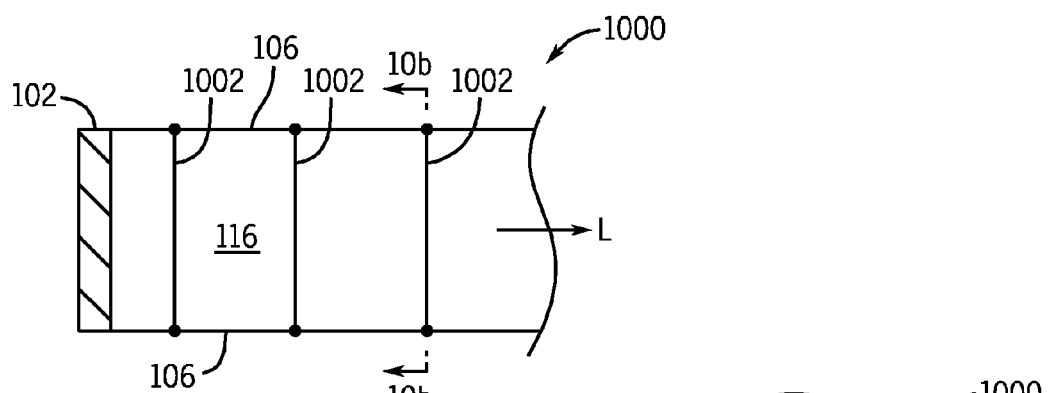
FIG. 10a illustrates a sectional side view of an expanded structural member having shape restraint members for constraining the cross-section of the member to a predetermined shape.
Figure 10B:
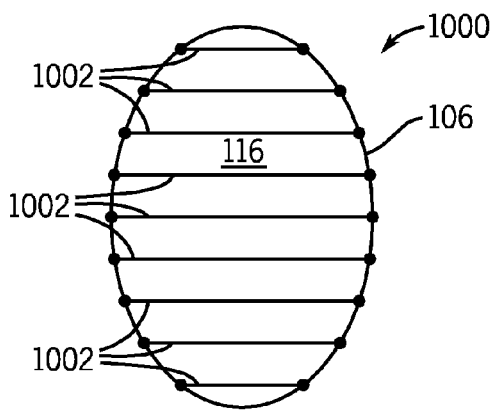
FIG. 10b illustrates a sectional view of the expanded structural member of FIG. 10a as taken along line 10b-10b.

Referring now to FIG. 10a, there is shown a sectional side view of an expanded structural member generally referred to by reference numeral 1000. The expanded structural member 100 can have any of the features described above and further has shape restraint members 1002 for constraining a cross-section of the member 1000 to a predetermined shape. As shown in FIG. 10a, the shape restraint members 1002 can be spaced along a length L of the expanded structural member 1000. The shape restraint members 1002 are preferably wires made from any suitable material, such as metal or natural or synthetic fiber and fastened at each end thereof to the covering 106 by any means known in the art. Such as by tying a knot on the exterior of the covering 106, clips, staples, sewing and the like. As shown in FIG. 10b, the shape restraint members 1002 are disposed along the cross section in various lengths to constrain the shape of the cross section. In the embodiment shown in FIG. 10b, the cross-section is shown as an oval, however, those skilled in the art will appreciate that any cross sectional shape is possible, such as an I-beam shape, circle, square, rectangle and the like. The shape restraint members 1002 can also be used with the members described above instead of a roller or form.

As an alternative to the shape restraint members 1002, frames (not shown) with the desired cross-sectional geometry may be attached at regular intervals along the length L of the beam member inside the covering 106. As the expanding foam 116 is released, the above frames would then constrain the beam cross-section to near the desired geometry.

When the beam member is to be cylindrical with a circular cross-section, the foam material is desired to be formed at the wall surfaces since the foam material positioned near the center of the member carries minimal bending load. Such beam elements are constructed best by sealing their ends (e.g., with end plates 102, 104), pressurizing their interior space 110 and then releasing the expanding foam 116 around the interior surfaces. A hollow cross-sectional shape, (e.g., where the foam is concentrated near the walls (covering 106)) can be readily achieved by having spread the base chemicals (parts A and B) over the interior of the covering and protecting it by a thin membrane (and a membrane between parts A and B). Once the element is pressurized, the membrane separating the chemicals can be released using one of the described techniques.

Other features may be used with any of the embodiments discussed above, for example, gas generating additives can be added the foam parts (A and B), so that once they are released by the removal or puncturing of a membrane, the foam parts are mixed and blown up by the generated gas. Any fabric made ropes and/or covering material can also soaked in foam and is thereby hardened and capable of taking compressive loads. The covering may contain reinforcing fibers oriented in the direction of maximum stress. The internal sealed volume of a member with non-permeable covering can be pressurized first to subject the longitudinal wires 120 (preferably springs or elastic materials that would significantly stretch during the pressurization press are preferred since a light reduction in length would not significantly reduce the preloading force level) to tensile stress. Since the cross-sectional area of the members is usually large, then one can exert large tensile forces on these elastic elements. Then when the beam (top surfaces) or column element is subjected to compressive loads, the tensile preload has to be overcome before the foam and lining material is subjected to compressive loads (the lining and foam assembly is weakest in compression). One could also use "wires" in the lateral and other general directions so that as a whole, the applied loads are optimally supported.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A ladder comprising:
   first and second expandable members, each of the first and second expandable members comprising:
      a covering capable of expansion, the covering defining a cavity; and
      expansion means for expanding foam in the cavity in an expansion direction to expand the covering into a predetermined shape;
   each of the first and second expandable members having a plurality of holes; and
   a rung, having a first end disposed in each of the plurality of holes of the first expandable member and a second end disposed in a corresponding hole in the second expandable member.

2. The ladder of claim 1, wherein the covering is pleated when compact.

3. The ladder of claim 1, further comprising first and second endplates, the covering being disposed between the first and second endplates.

4. The ladder of claim 3, wherein the expansion means comprises:
   a first inlet formed in one of the first and second endplates, the first inlet being in communication with the cavity; and
   a source in communication with the first inlet for supplying foam in a liquid state to the cavity via the first inlet.

5. The ladder of claim 4, further comprising:
   a second inlet formed in one of the first and second endplates, the second inlet being in communication with the cavity; and
   a gas source in communication with the second inlet for supplying gas to the cavity via the second inlet for at least one of pre-expanding the covering and facilitating filling of the cavity with the foam.

6. The ladder of claim 1, further comprising bulge prevention means for preventing bulging of the covering in a direction other than the expansion direction.

7. The ladder of claim 1, further comprising one or more tensile elements disposed in the cavity for carrying at least a portion of a tensile load on the first and second expandable members.

8. The ladder of claim 1, wherein the expansion means comprises:
   first and second capsules disposed in the cavity, the first capsule having a first liquid therein, the second capsule having a second liquid therein, the first and second liquids when combined reacting to form the foam; and
   means for mixing the first and second liquids.

9. The ladder of claim 8, wherein the means for mixing comprises:
   the first and second capsules having a skin encapsulating the first and second liquids, respectively; and
   a cable having the first and second capsules formed thereon, the cable having a mixing means disposed on the cable, the cable being capable of being withdrawn through the cavity such that the skin is broken and the mixing means facilitates mixing of the first and second liquids.

10. The ladder of claim 9, wherein the cable further comprises:
    one or more wires for carrying at least a portion of a tensile load on the member, each of the one or more tensile elements being capable of being expanding in the expansion direction and being connected to one of the first and second endplates at a first end and being connected to the cable at a second end; and
    means for fixing the second end to the other of the first and second endplates upon expansion of the one ore more wires.

11. The ladder of claim 1, further comprising a grommet disposed in each of the plurality of holes.

12. The ladder of claim 11, further comprising a connection means for connecting each of the grommets together such that they react to an applied force as a unitary member.

13. The ladder of claim 12, further comprising first and second endplates, the covering being disposed between the first and second endplates, wherein the connection means comprises a wire connected between each of the grommets and between at least one of the first and second endplates and at least one of the grommets.

14. The ladder of claim 13, wherein the wire is connected between each of the grommets by winding the wire around an outside circumference of the grommet.

15. The ladder of claim 1, further comprising locking means for locking the rungs in the plurality of holes.

* * * * *